United States Patent

Kim et al.

[11] Patent Number: 6,061,203
[45] Date of Patent: May 9, 2000

[54] DEVICE FOR OPENING LIDS OF VARYING SIZED TAPE CASSETTES IN A MAGNETIC RECORDING AND REPRODUCING APPARATUS

[75] Inventors: Woon-bae Kim; Chang-woo Lee, both of Kyonggi-do, Rep. of Korea

[73] Assignee: Samsung Electronics Co., Ltd., Kyungki-do, Rep. of Korea

[21] Appl. No.: 09/012,003

[22] Filed: Jan. 22, 1998

[30] Foreign Application Priority Data

Jan. 22, 1997 [KR] Rep. of Korea .......................... 97-1693

[51] Int. Cl.[7] .................................................. G11B 5/008
[52] U.S. Cl. ........................................... 360/94; 242/338.2
[58] Field of Search ..................... 360/94, 96.5; 242/336

[56] References Cited

U.S. PATENT DOCUMENTS

| | | | |
|---|---|---|---|
| 5,316,236 | 5/1994 | Hasegawa et al. | 360/94 |
| 5,568,339 | 10/1996 | Ando | 360/94 |
| 5,587,856 | 12/1996 | Aoyama | 360/99.02 |
| 5,617,271 | 4/1997 | Nishimura et al. | 360/94 |
| 5,689,392 | 11/1997 | Sato | 360/132 |
| 5,694,274 | 12/1997 | Standiford et al. | 360/109 |
| 5,806,777 | 9/1998 | Kobayashi | 242/336 |

*Primary Examiner*—Jefferson Evans
*Attorney, Agent, or Firm*—Sughrue, Mion, Zinn, Macpeak & Seas, PLLC

[57] ABSTRACT

An opening device is provided for opening a lid of a tape cassette in a magnetic recording and reproducing apparatus which can be constructed to receive a first and second tape cassette having different sizes. The opening device includes first and second opening sections for opening the lid of the tape cassette which has been loaded in the apparatus. The first and second opening sections are integrally formed and disposed on a predetermined position on a main base of the apparatus, thus resulting in a more compact size.

2 Claims, 4 Drawing Sheets

DEVICE FOR OPENING LIDS OF VARYING SIZED TAPE CASSETTES IN A MAGNETIC RECORDING AND REPRODUCING APPARATUS

BACKGROUND OF THE INVENTION

1. Field of the Invention

The present invention relates to a magnetic recording and reproducing apparatus including a video cassette recorder (hereinafter, referred to as VCR), a camcorder, and a digital video cassette recorder (hereinafter, referred to as D-VCR), in which two types of tape cassettes can be used. More particularly, the present invention is directed to an opening device for opening a lid of a tape cassette in a magnetic recording and reproducing apparatus, in which a structure of the opening device is simplified, resulting in decreased manufacturing costs and being easily installed in a narrow space so that a deck of the magnetic recording and reproducing apparatus has a compact size.

2. Description of the Related Art

In association with various recording and reproducing apparatuses, including a VCR, a camcorder, and a D-VCR, the recording and reproducing methods of each recording and reproducing apparatus require different shaped tapes.

Therefore, various attempts at using different sized tapes in a magnetic recording and reproducing apparatus have been tried along with technical improvements of magnetic recording and reproducing apparatuses.

FIG. 1 and FIG. 2 show tape cassettes having different sizes. Hereinafter, a tape cassette C10 being relatively large in size is referred to as a standard tape cassette while a tape cassette C20 being relatively small in size is referred to as a small tape cassette.

As mentioned above, in a typical magnetic recording and reproducing apparatus in which the standard tape cassette C10 or the small tape cassette C20 is selectively used, the standard tape cassette C10 or the small tape cassette C20 is horizontally and vertically conveyed by a cassette holder and combined with a reel assembly.

When the standard or small tape cassette is combined with the reel assembly, a tape is extracted from the tape cassette. Therefore, the lid of the standard or small tape cassette must be opened in order to extract the tape. Generally, the lid of the standard tape cassette or the small tape cassette is opened by a lid opening device during the loading operation when the cassette is conveyed downward with the cassette holder.

Hereinafter, a conventional opening device for opening a lid of a tape cassette will be described with reference to the accompanying drawings.

As shown in FIG. 3, the opening device for opening the lid of the tape cassette according to the conventional art includes a first opening member 10 for opening the lid C11 of the standard tape cassette C10 and a second opening member 20 for opening the lid C21 of the small tape cassette C20. The first opening member 10 and the second opening member 20 are arranged on and fixed to a main base by a general fixing member, for example a screw 2 and 3, etc. The first opening member 10 and second opening member 20 are separate parts which are fixed to the main base apart from each other at a predetermined distance. The lid opening pins 11 and 21 of the lid opening members 10 and 20 have a different height, corresponding to a difference between the heights of the lids C11 and C12 of the tape cassettes C10 and C20. A reference numeral 4 indicates a rotating head drum.

In the opening device for opening the lid of the tape cassette as described above, when the standard tape cassette C10 or the small tape cassette C20 is moved downward, the lid opening pin 11 or 12 of the first opening member 10 or the second opening member 20 pushes upward and opens the lid C11 or C21 of the standard tape cassette C10 or the small tape cassette C20. As the downward traveling of the standard tape cassette C10 or the small tape cassette C20 is completed and the lid C11 or C21 of the standard tape cassette C10 or small tape cassette C20 is completely opened, the operation of extracting the tape from the standard tape cassette C10 or the small tape cassette C20 can be carried out.

However, in the conventional opening device there are disadvantages in that since the first opening member 10 and the second opening member 20 are separately made in order to open the lid C11 or C21 of the tape cassette C10 or C20 and furthermore are secured by the fixing screws 2 and 3 to the main base 1, the number of parts is increased, the manufacturing cost is increased, and a working efficiency is decreased.

Also, there is another problem in that space is specifically required for respectively mounting the first opening member 10 and the second opening member 20; therefore, it is difficult to have a compact sized deck for the magnetic recording and reproducing apparatus.

SUMMARY OF THE INVENTION

The present invention has been made to overcome the above described problem of the conventional device. One object of the present invention is to provide an opening device for opening a lid of a tape cassette in a magnetic recording and reproducing apparatus having a simplified structure, to decrease manufacturing costs.

Another object of the present invention to provide an opening device for opening a lid of a tape cassette in a magnetic recording and reproducing apparatus, which is mounted in a narrow space of a deck in a magnetic recording and reproducing apparatus so that the deck can be compact.

To accomplish the above objects of the present invention, an opening device is provided for opening a lid of a tape cassette in a magnetic recording and reproducing apparatus which can be constructed to receive a first tape cassette and a second tape cassette, comprising a first opening section for opening a lid of the first tape cassette opening and a second opening section for opening a lid of the second tape cassette opening which is received in the magnetic recording and reproducing apparatus, wherein the first opening section and the second opening section are integrally formed and disposed at a predetermined position on a main base.

Preferably, the first and second opening sections have different heights from each other.

If the first tape cassette is larger in size than the second tape cassette, the second opening section has a step portion positioned lower than the first opening section.

BRIEF DESCRIPTION OF THE DRAWINGS

The above objects and other advantages of the present invention will become more apparent by describing in detail the preferred embodiment thereof with reference to the attached drawings, in which:

FIG. 1 and FIG. 2 show tape cassettes of different sizes, wherein FIG. 1 is a perspective view of a standard tape cassette and FIG. 2 is a perspective view of a small tape cassette;

FIG. 5 and FIG. 6 show states of the standard tape cassette, of which the lid is opened by the lid opening device according to the embodiment of the present invention, wherein FIG. 5 is a plan view of the standard tape cassette and the lid opening device and FIG. 6 is a side view of the standard tape cassette and the lid opening device; and FIG. 7 and FIG. 8 show states of the small tape cassette, of which the lid is opened by the lid opening device according to the embodiment of the present invention, wherein FIG. 7 is a plan view of the small tape cassette and the lid opening device and FIG. 8 is a side view of the small tape cassette and the lid opening device.

DETAILED DESCRIPTION OF THE PREFERRED EMBODIMENTS

Hereinafter, an opening device for opening a lid of a tape cassette according to a preferred embodiment of the present invention, which is used in a magnetic recording and reproducing apparatus, will be described in detail with reference to the accompanying drawings.

Figure 1:
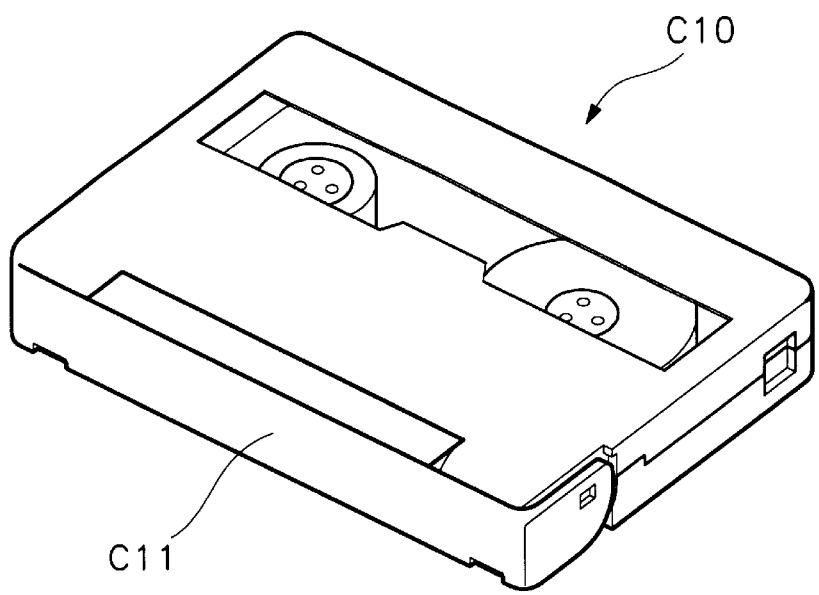
Figure 2:
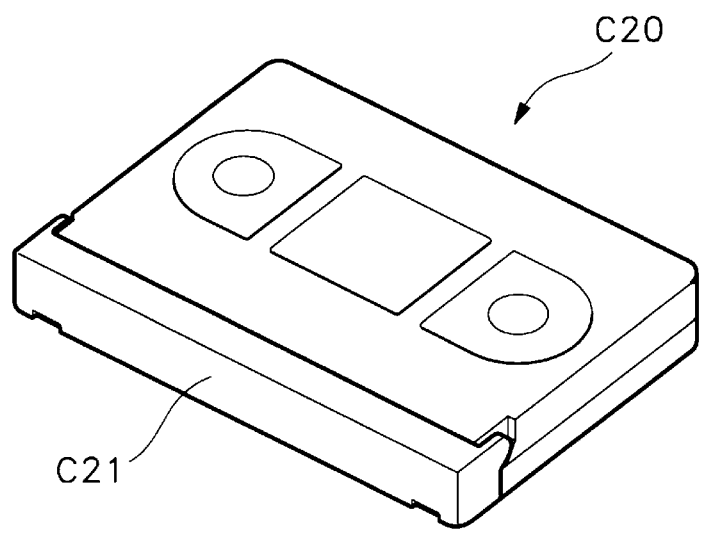
Figure 3:
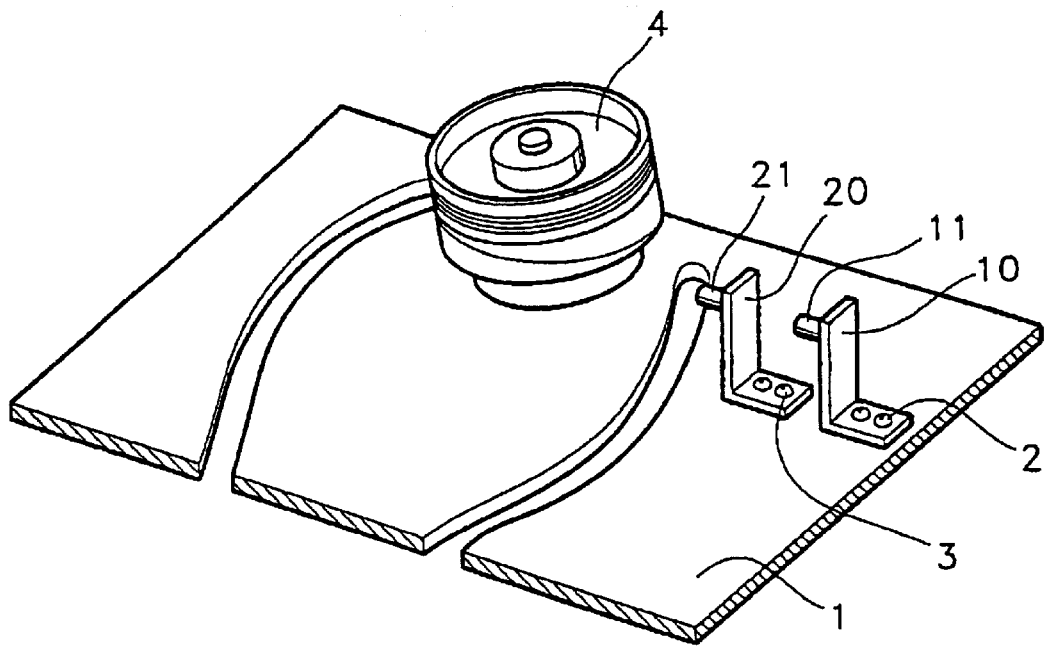
FIG. 3 is a perspective view of an opening device for opening a lid of a tape cassette according to an embodiment of a conventional art, which is used in a magnetic recording and reproducing apparatus.
Figure 4:
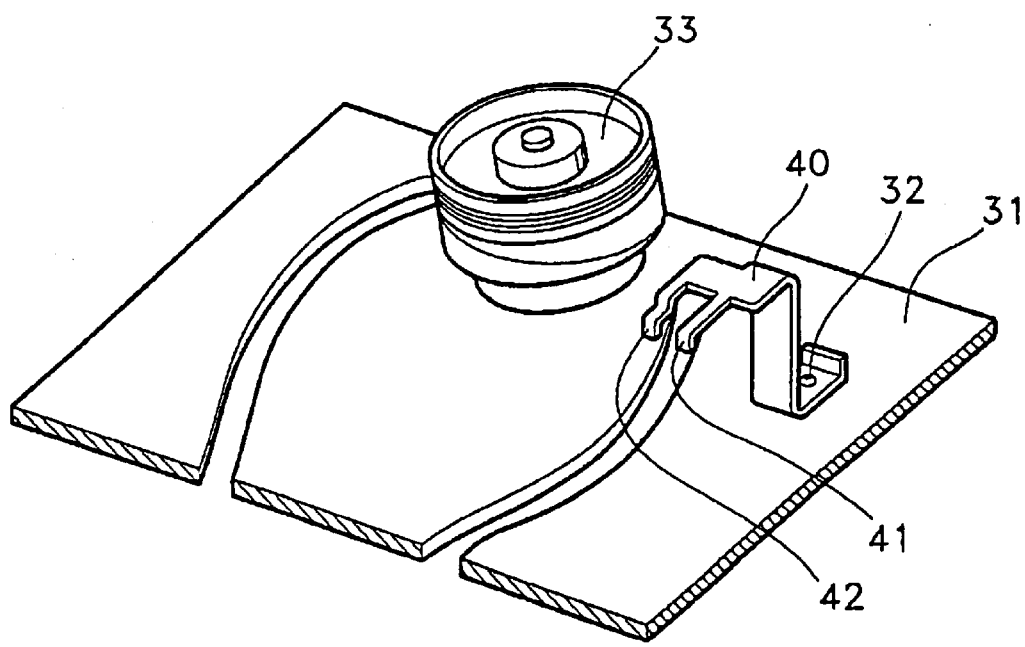
FIG. 4 is a perspective view of an opening device for opening a lid of a tape cassette according to an embodiment of the present invention, which can be used in a magnetic recording and reproducing apparatus.
Figure 5:
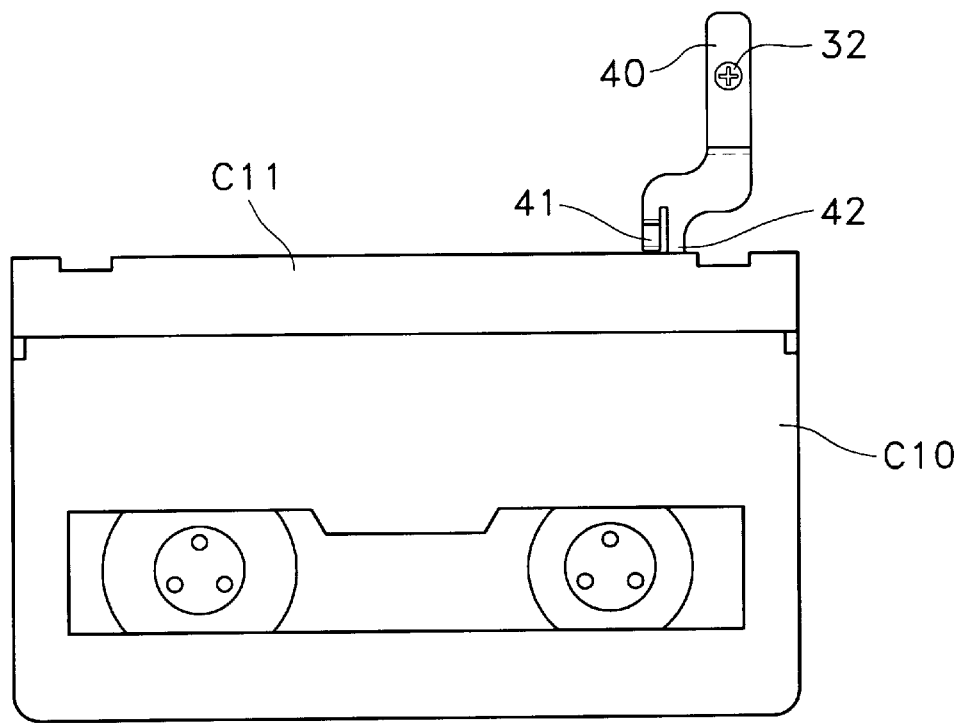
Figure 6:
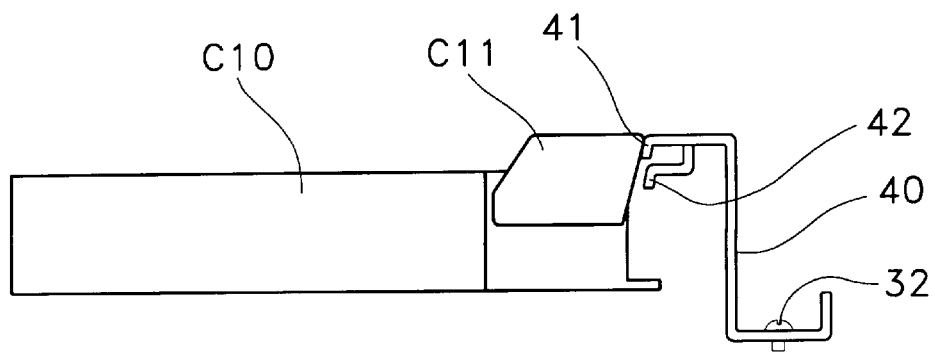
Figure 7:
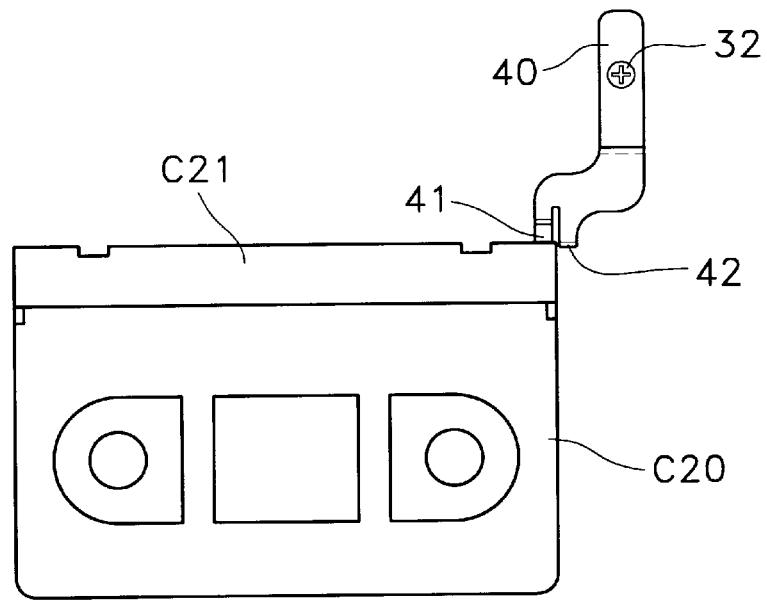
Figure 8:
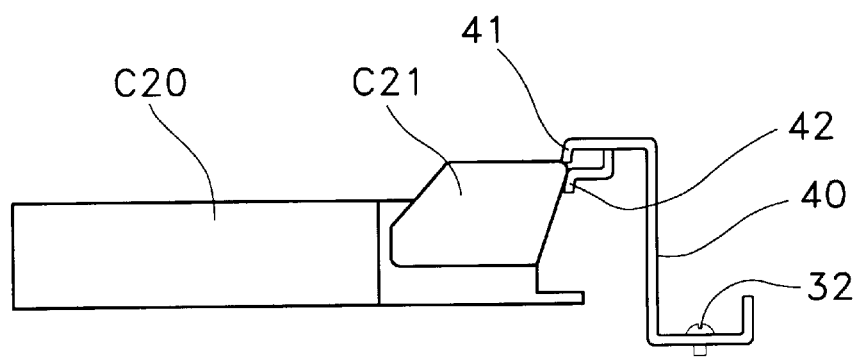

FIG. 4 is a perspective view of the opening device for opening the lid of the tape cassette according to the present invention, which is used in the magnetic recording and reproducing apparatus; FIGS. 5 and 6 show states of the standard tape cassette, of which the lid is opened by the lid opening device according to the present invention; and FIGS. 7 and 8 show states of the small tape cassette, of which the lid is opened by the lid opening device according to the present invention.

A deck mechanism of the magnetic recording and reproducing apparatus having the opening device for opening the lid of the tape cassette according to the present invention is constructed in order to receive two types of tape cassettes C10 and C20 which are different from each other in size.

The standard tape cassette C10 or the small tape cassette C20 can be disposed in a cassette holder (not shown) which moves horizontally and vertically and arranges the standard tape cassette C10 or the small tape cassette C20 on a reel assembly (not shown) mounted on a main base 31. Then, a loading mechanism extracts a tape from the standard tape cassette C10 or the small tape cassette C20.

The opening device for opening the lid of the tape cassette according to the present invention, which is used in the magnetic recording and reproducing apparatus, includes a lid opening member 40 which has a first opening section 41 and a second opening section 42 formed integrally.

The single lid opening member 40 is secured to the main base 31 by fixing member 32, for example, a screw.

The single lid opening member 40 according to the present invention is characterized by having both the first opening section 41 and the second opening section 42. The second opening section 42 has a step portion formed at a lower position corresponding to the difference between the heights of the tape cassettes C10 and C20.

The first opening section 41 is positioned at a position opposed to an upper portion of the lid C11 of the standard tape cassette C10, and the second opening section 42 is positioned at a position opposed to an upper portion of the lid C21 of the small tape cassette C21. A reference numeral 33 indicates a rotary head drum.

Hereinafter, the operation of the opening device for opening the lid of the tape cassette according to the present invention described above will be described.

As described above, the cassette holder which has received the standard tape cassette C10 and the small tape cassette C20, moves horizontally and vertically by means of the general loading mechanism. In the case that the standard tape cassette C10 is loaded on the cassette holder as shown FIGS. 5 and 6, an end of the first opening section 41 makes contact with the lower edge of the lid and pushes the lid upward as the standard tape cassette C10 moves downward by the cassette holder. Thereby, the lid of the standard tape cassette is rotated at a predetermined angle and is opened. In the case that the small tape cassette C20 is loaded on the cassette holder as shown FIGS. 7 and 8, an end of the second opening section 42 makes contact with the lower edge of the lid and pushes the lid upward as the small tape cassette C20 moves downward by the cassette holder. Thereby, the lid of the small tape cassette C20 is rotated at a predetermined angle and is opened.

When the standard tape cassette C10 or the small tape cassette C20 is combined with the reel assembly and the lid C11 or C21 is completely opened, the tape is extracted from the tape cassette to a head drum by means of the loading mechanism.

In the magnetic recording and reproducing apparatus having the cassette holder which is capable of receiving the first tape cassette and the second tape cassette and causing them to be positioned at the main base while the lid is opened during loading, includes the simple opening member having both the first opening section and the second opening section integrally formed and disposed at a predetermined position on a main base, which respectively open the lid of either the first or second tape cassette. As described above, this simplified structure provides the advantage of decreasing manufacturing costs of the lid opening device. Furthermore, since the lid opening device can be installed at a narrow area, the deck of the magnetic recording and reproducing apparatus can be compact in size.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. An opening device for opening a lid of a tape cassette in a magnetic recording and reproducing apparatus, constructed to receive a first tape cassette and a second tape cassette, of which a lid opening operation is carried out during the loading of the first tape cassette or the second tape cassette, comprising:

a first opening section for opening a lid of the first tape cassette opening which is received in the magnetic recording and reproducing apparatus; and a second opening section for opening a lid of the second tape cassette opening which is received in the magnetic recording and reproducing apparatus, wherein said first opening section and said second opening section are integrally formed into a single lid opening member disposed at a predetermined position on a base member so that said first and second opening sections project therefrom parallel to the base member, wherein said first and second opening sections have heights different from each other and, wherein said second opening section has a step portion positioned lower than said first opening section so that said step portion is positioned at a height for opening the second tape cassette which is smaller than the first tape cassette.

2. An opening device for opening a lid of a tape cassette in a magnetic recording and reproducing apparatus adapted to receive a first tape cassette and a second tape cassette, wherein a lid opening operation is carried out during loading of one of the first tape cassette and the second tape into a respective first cassette opening and second cassette opening of said apparatus, said opening device comprising:

a first opening section for opening a lid of the first tape cassette opening which is received in the magnetic recording and reproducing apparatus; and a second opening section for opening a lid of the second tape cassette opening which is received in the magnetic recording and reproducing apparatus, wherein said first opening section and said second opening section are integrally formed and disposed at a predetermined position on a base member, so that said first and second opening sections project toward said lid of the first tape cassette and the second tape cassette, from said base member, wherein said first and second opening sections have heights different from each other, wherein said second opening section is lower than said first opening section for opening the second tape cassette which is smaller than the first tape cassette, and wherein said second opening section has a step portion positioned lower than said first opening section.

* * * * *